Nov. 23, 1937.        F. HEJDUK ET AL        2,100,052
METER FOR MEASURING AND REGISTERING LIQUID VOLUMES RECEIVED AND DELIVERED
Filed Dec. 9, 1935        2 Sheets-Sheet 1

INVENTORS:
Frantisek Hejduk
Jan Neumann
by Benj Chrony
attorney

Nov. 23, 1937.  F. HEJDUK ET AL  2,100,052
METER FOR MEASURING AND REGISTERING LIQUID VOLUMES RECEIVED AND DELIVERED
Filed Dec. 9, 1935   2 Sheets-Sheet 2

Inventors
František Hejduk,
Jan Neumann,
by Ben J. Cohrony
their Attorney

Patented Nov. 23, 1937

2,100,052

UNITED STATES PATENT OFFICE 2,100,052

METER FOR MEASURING AND REGISTERING LIQUID VOLUMES RECEIVED AND DELIVERED

František Hejduk and Jan Neumann, Prague, Czechoslovakia

Application December 9, 1935, Serial No. 53,656
In Germany February 9, 1935

2 Claims. (Cl. 73—198)

The object of the present invention is to provide a current-flow meter with means for operating a counting or registering device, while a further object is to provide an arrangement which will automatically register with one single meter both the amounts delivered through the said meter into a storage reservoir or withdrawn therefrom through the meter.

In the measurement of large quantities of liquids, in the storage of gasolene for example, it is essential that both the volumes of the oil received as well as those delivered should be measured. The measurement of the volumes by a current-flow meter is to be preferred to weighing because less expensive apparatus is required, and a speedier result is obtained but principally because the ascertained volumes remain permanently registered on the measuring apparatus and also because the process of measurement does not interfere with the flow of the liquid.

When, however, the quantities of a specified liquid received and withdrawn are measured one after the other by the same measuring instrument, the subsequent result is imperfect because the reading of the meter includes both the volume received and also that given out and there is no possibility of distinguishing between the two. Nor is the desired result obtained even when two meters, one for the reception and the other for the delivery, are made use of, because each meter functions with a certain inaccuracy, however slight, and the inaccuracies are not the same for the two meters with the result that, after a certain time, there arises a discrepancy between the volume in the reservoir and the difference registered by the two meters. This discrepancy becomes greater and greater in the course of time because it must be assumed that each meter will lose its original precision to a greater or less degree as time advances as a result of wear in the measuring elements. From the point of view of outlay, the use of two meters is also less advantageous.

The object of the present invention is to remedy these drawbacks.

The apparatus according to the invention makes use of one single meter for both the inflow and outflow. Even when this meter is not absolutely accurate, the volumes of both the inflowing and outflowing liquids are measured subject to this error and the two errors largely cancel out. The errors of the readings of the measuring apparatus have no practical effect on the correctness of the reading of the quantity in the reservoir as is the case when two meters are employed. The meter has two independent counting devices and either one or the other is actuated, depending on the position of the distribution member—usually a fourway cock—which controls the flow of the liquid being measured.

One construction of apparatus according to the invention is shown diagrammatically in the accompanying drawings, from which all auxiliary apparatus not directly connected with the method of operating, such as filters, air-separators etc. has been omitted. In the drawings, in which corresponding elements are indicated by the same reference characters: Fig. 1 shows diagrammatically the positions of the parts when the liquid is taken from supply tanks into the reservoir;

Figure 1:
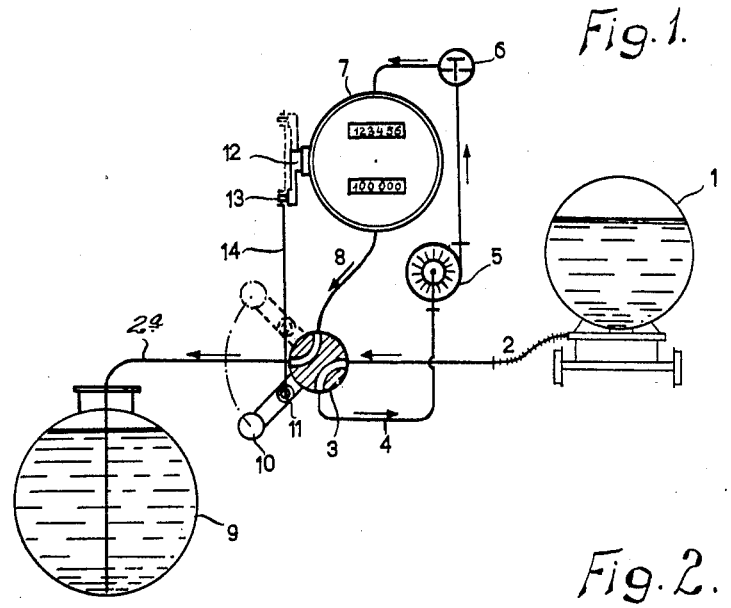

In the arrangement shown in Fig. 1, the liquid issuing, for instance, from the supply tank or cistern 1, is pumped through the hose and conduit or pipe 2, through one side of the fourway valve 3, which may be in the form of a four-way cock, through the pipe 4 to the centrifugal pump 5 and past the non-return valve 6 into the current-flow meter 7, whence it flows through the pipe 8, the other side or channel or cock 3 and the pipe or conduit 2a into the storage reservoir 9. The connection between the cock 3 and the meter 7 is adjusted equably; the current-flow meter 7 is fitted between the two sections of the connecting pipe and the liquid must steadily flow through the latter in one direction. For the accurate measurement of liquids it is customary to connect into the path of the stream traversing the meter, a strainer and an air separator, which are adapted to function properly for only one direction of flow, and hence it is important that the arrangements of connections of the meter in the stream flow path with the strainer and air separator are such that the stream traverses their part of the path in only one direction, regardless of the terminal where delivery is being made. The meter has two indicators or counting devices, one for the inflow and the other for the outflow of the liquid. In order to ensure that the registration of the flow shall take place in accordance with the position of the cock 3, a mechanical connection is provided between the operating spindle of cock 3 and the counting mechanism. In the drawings the handle 10 of the cock is shown as having pivoted to it at 11 one end of a link 14 which has its other end connected at 13 to a lever or crank 12, projecting from the meter 7, by which change over of the counting devices can be effected. The lever 12 has two positions; in one position, the counter registers the amount of liquid that flows in, and in the other, the volume flowing out. The actual change over from one counter to the other is effected in the middle position of the cock 3, in which any flow of liquid is prevented.

Figure 2:
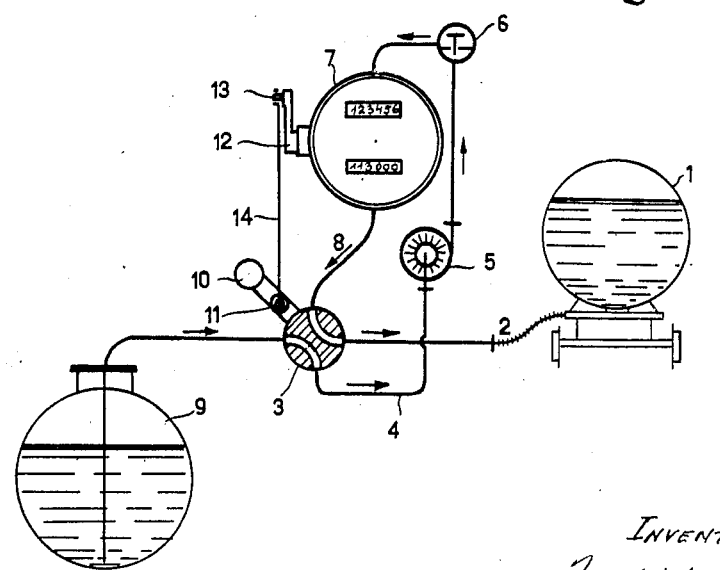
Fig. 2 is a similar diagram showing the arrangement when the liquid is conveyed in the opposite direction.

In Fig. 2 is shown the positions of the cock 3 and the levers 10 and 12 when the liquid is drawn off from the storage reservoir 9 and is conducted through the pipe system 2a, 4, 8, 2 into a railway tank car 1. The cock is reversed by movement of the lever 10 and the motion is transmitted by the link 14 to the lever 12 of the meter.

Figure 3:
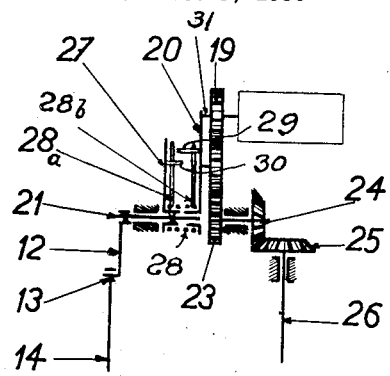
Fig. 3 shows in front elevation a detail of a gear transmission system for selectively actuating either register of the current flow meter, by current flow.
Figure 4:
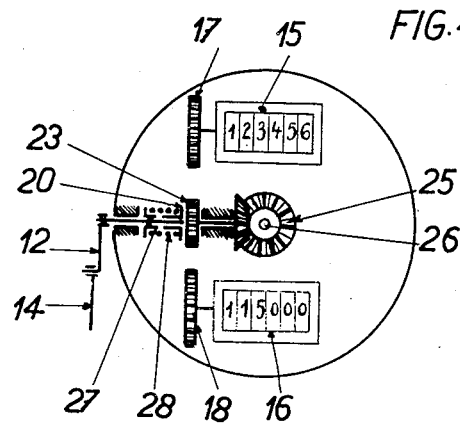
Fig. 4 shows the registers in operative relation with their actuating gear wheels.
Figure 5:
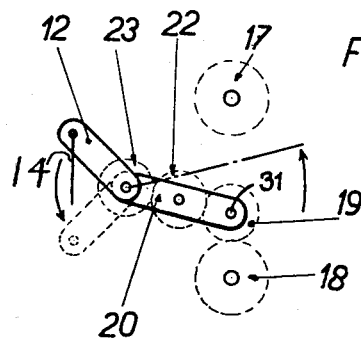
Fig. 5 shows in side elevation the relations of a train of gear wheels for selectively actuating either register.

The change-over mechanism whereby movement of link 14 selectively sets the driving mechanism into actuating position to drive either the upper or the lower registering dial of meter 7, may consist of simple gear and lever mechanism familiar in the art, of which the following is an explanatory example, and is shown in Figs. 3, 4, and 5.

The counting mechanisms 15 and 16 for registering the quantity of flow into and from the storage tank are driven by gear wheels 17 and 18 respectively, one of which at a time is engaged by the gear wheel 19. This gear wheel 19 is rotatably mounted on lever 20, which lever can be so displaced about the shaft 21 carrying lever 12 that the gear wheel 19 engages with and drives either gear wheel 17 or 18. This gear wheel 19 in turn is driven through the gear wheels 22 and 23 from the bevel gears 24 and 25 of the measuring shaft 26, which shaft always turns in the same direction. When handle 10 places valve 3 in a position to prevent any flow through the valve, gear wheel 19 is not in engagement with either gear wheel 17 or 18.

Lever 20 is preferably mounted resiliently displaceable on shaft 21, so that there is resilient engagement between gear wheel 19 and gear wheel 17 or 18. In a convenient known means of accomplishing this, the lever 20 constitutes one side of an elastic coupling, whose second side being the lever 27 is keyed fast on the shaft 21, and the two sides of the coupling are connected together by a spring 28.

The lever 20 has a flanged portion by which it is freely journaled on shaft 21. The lever 27 has a flanged portion by which it is keyed to shaft 21. Lever 20 carries a stub-shaft 31 on which is rotatably mounted gear-wheel 19. Lever 20 carries a forked member 29 which is positioned to engage one free end 28b of spring 28. Lever 27 carries a forked member 30 which is positioned to engage the other free end 28a of spring 28.

The shaft 21 is rotatably actuated by actuation of the four-way valve 3 (Figs. 1 and 2) by means of the lever 12 and the connecting rod 14. The arrangement of such an elastic coupling makes possible displacements of different magnitudes of lever 20 and of lever 12. Upon changing over at the distributing valve 3, the lever 20 is swung along until the gear wheel 19 meshes with gear wheel 17 or gear wheel 18. Upon further rotation of lever 12 and shaft 21, the lever 20 moves no further, and the motion is taken up by the spring 28.

The diagram shows only one embodiment of a practical realization but other embodiments are also possible without deviating from the characteristic feature of the invention. Having now described the invention, what we desire to secure by Letters Patent of the United States and what we claim is:

1. In a two-way system for selectively measuring liquid flow, a pair of tanks, a pair of conduits respectively connecting with said tanks, a current-flow meter comprising a pair of registers and adjustable control means for selectively actuating either of said registers, said meter further comprising liquid-flow actuatable means and a liquid inlet and outlet communicating with said last mentioned means, said last mentioned means being in operative relation with said control means for selectively actuating either of said registers as said control means is adjusted, a four-way valve connected for selectively connecting in its first position the inlet of said meter to the conduit of a first one of said tanks and the outlet of said meter to the conduit of a second one of said tanks, or connecting in its second position the inlet of said meter to the conduit of said second one of said tanks and the outlet of said meter to the conduit of said first one of said tanks, and interlocking means interlocking said valve and said control means for causing said control means to actuate a first one of said registers when said valve is in said first position and to actuate a second one of said registers when said valve is in said second position.

2. In a two-way system for selectively measuring liquid flow, a pair of tanks, a pair of conduits respectively connecting with said tanks, a current-flow meter comprising a pair of registers and adjustable control means for selectively actuating either of said registers, said meter further comprising liquid-flow actuatable means and a liquid inlet and outlet communicating with said last mentioned means, said last mentioned means being in operative relation with said control means for selectively actuating either of said registers as said control means is adjusted, a four-way valve connected for selectively connecting in its first position the inlet of said meter to the conduit of a first one of said tanks and the outlet of said meter to the conduit of a second one of said tanks, or connecting in its second position the inlet of said meter to the conduit of said second one of said tanks and the outlet of said meter to the conduit of said first one of said tanks, flow direction control means connected between said inlet of said meter and said valve for permitting flow only in the direction from said valve to said inlet, and interlocking means interlocking said valve and said control means for causing said control means to actuate a first one of said registers when said valve is in said first position and to actuate a second one of said registers when said valve is in said second position.

FRANTIŠEK HEJDUK.
JAN NEUMANN.